US012609236B2

(12) United States Patent
Eda et al.

(10) Patent No.: US 12,609,236 B2
(45) Date of Patent: Apr. 21, 2026

(54) COIL COMPONENT

(71) Applicant: TDK CORPORATION, Tokyo (JP)

(72) Inventors: Hokuto Eda, Tokyo (JP); Hitoshi Ohkubo, Tokyo (JP); Masazumi Arata, Tokyo (JP); Masataro Saito, Tokyo (JP); Kohei Takahashi, Tokyo (JP); Takamasa Iwasaki, Tokyo (JP)

(73) Assignee: TDK CORPORATION, Tokyo (JP)

( * ) Notice: Subject to any disclaimer, the term of this patent is extended or adjusted under 35 U.S.C. 154(b) by 830 days.

(21) Appl. No.: 17/866,837

(22) Filed: Jul. 18, 2022

(65) Prior Publication Data

US 2023/0022189 A1 Jan. 26, 2023

(30) Foreign Application Priority Data

Jul. 21, 2021 (JP) ................................ 2021-120283

(51) Int. Cl.

*H01F 27/28* (2006.01)
*H01F 27/32* (2006.01)
*H01F 27/29* (2006.01)

(52) U.S. Cl.

CPC ..... *H01F 27/2847* (2013.01); *H01F 27/2876* (2013.01); *H01F 27/324* (2013.01); *H01F 27/29* (2013.01); *H01F 27/327* (2013.01)

(58) Field of Classification Search

CPC ............. H01F 27/2847; H01F 27/2876; H01F 27/324; H01F 27/29; H01F 27/327; H01F 17/04; H01F 2017/002; H01F 2017/048; H01F 27/22; H01F 17/0013

USPC ........................................ 336/200, 199, 232

See application file for complete search history.

(56) References Cited

U.S. PATENT DOCUMENTS

| | | | | |
|---|---|---|---|---|
| 6,480,086 B1 * | 11/2002 | Kluge | H01F 17/0013 336/200 |
| 2013/0342301 A1 * | 12/2013 | Mano | H01F 41/041 336/200 |
| 2014/0176284 A1 * | 6/2014 | Lee | H01F 17/0013 336/200 |
| 2015/0325510 A1 * | 11/2015 | Choi | H01L 21/486 257/774 |
| 2019/0259522 A1 * | 8/2019 | Kim | H01F 27/24 |
| 2021/0166858 A1 | 6/2021 | Saito et al. | |
| 2022/0208433 A1 * | 6/2022 | Bong | H01F 27/29 |

FOREIGN PATENT DOCUMENTS

| | | |
|---|---|---|
| JP | 2003-31416 A | 1/2003 |
| JP | 2006-310716 A | 11/2006 |
| JP | 2014-127717 A | 7/2014 |
| JP | 2015-130472 A | 7/2015 |
| JP | 2015-216341 A | 12/2015 |
| JP | 2016-197624 A | 11/2016 |
| JP | 2019-145768 A | 8/2019 |
| JP | 2021-89936 A | 6/2021 |

* cited by examiner

*Primary Examiner* — Shawki S Ismail
*Assistant Examiner* — Kazi S Hossain
(74) *Attorney, Agent, or Firm* — Oliff PLC

(57) ABSTRACT

In a coil component, heat radiation around a through conductor is improved. In the coil component, since the cross-sectional area of the inner end portion of the planar coil is designed to be relatively large, heat generated in the through conductor is easily transferred to the inner end portion. Since heat is efficiently transferred from the through conductor to the inner end portion, high heat radiation around the through conductor is achieved.

8 Claims, 7 Drawing Sheets

COIL COMPONENT

CROSS-REFERENCE TO RELATED APPLICATIONS

This application is based upon and claims the benefit of priority from Japanese Patent Application No. 2021-120283, filed on 21 Jul. 2021, the entire contents of which are incorporated herein by reference.

TECHNICAL FIELD

The present disclosure relates to a coil component.

BACKGROUND

Well known in the art is a coil component provided with a plurality of coils in an element body. Japanese Unexamined Patent Publication No. JP2015-130472A discloses a coil component having two coils in an element body and four terminals, in which planar coils provided on both faces of an insulating substrate are connected to each other via through conductors.

SUMMARY

In the coil component as described above, the temperature around the through conductor may become excessively high during driving, and in this case, the stability of the element characteristics may become low. The inventors have made intensive studies on heat radiation around the through conductor and have newly found a technique capable of improving heat radiation.

According to the present disclosure, there is provided a coil component improved in heat radiation around a through conductor.

A coil component according to one aspect of the present disclosure includes an element body, an insulating substrate provided in the element body, a pair of coil portions including a pair of planar coils wound alongside with each other on the insulating substrate and a pair of through conductors respectively overlapping inner end portions of the planar coils adjacent to each other and penetrating the insulating substrate. In a cross section orthogonal to the insulating substrate, a cross-sectional area of the inner end portion of the planar coil is larger than a cross-sectional area of a portion of the planar coil located outside the inner end portion, and is larger than a cross-sectional area of the through conductor.

In the above-described coil component, since the cross-sectional area of the through conductor is relatively narrow and the current density of the current flowing through the planar coil during driving is high in the through conductor, heat is easily generated. However, since the cross-sectional area of the inner end portion of the planar coil overlapping the through conductor is larger than the cross-sectional area of the planar coil located outside of the inner end portion, the heat generated in the through conductor is easily transferred to the inner end portion. As described above, in the coil component, since heat is efficiently transferred from the through conductor to the inner end portion, high heat radiation around the through conductor is achieved.

In the coil component according to another aspect of the present disclosure, the inner end portion of the planar coil is lower than a portion of the planar coil located outside the inner end portion.

In the coil component according to another aspect of the present disclosure, the inner end portion of the planar coil is wider than a portion of the planar coil located outside the inner end portion.

In the coil component according to another aspect of the present disclosure, the planar coil is covered with an insulating material, and the insulating material covering the inner end portion of the planar coil is thicker than the insulating material covering a portion of the planar coil located outside the inner end portion.

In the coil component according to another aspect of the present disclosure, the insulating substrate is thinner than the inner end portion of the planar coil.

In the coil component according to another aspect of the present disclosure, thicknesses of inner end portions of the pair of planar coils are different from each other.

In the coil component according to another aspect of the present disclosure, the insulating substrate is thinner than a dimension of the through conductor in an extending direction of the insulating substrate.

In the coil component according to another aspect of the present disclosure, the through conductor has a constricted cross-sectional shape in a cross-section orthogonal to the insulating substrate.

In the coil component according to another aspect of the present disclosure, the through conductor is biased outward with respect to the inner end portion of the planar coil.

DETAILED DESCRIPTION

Figure 1:
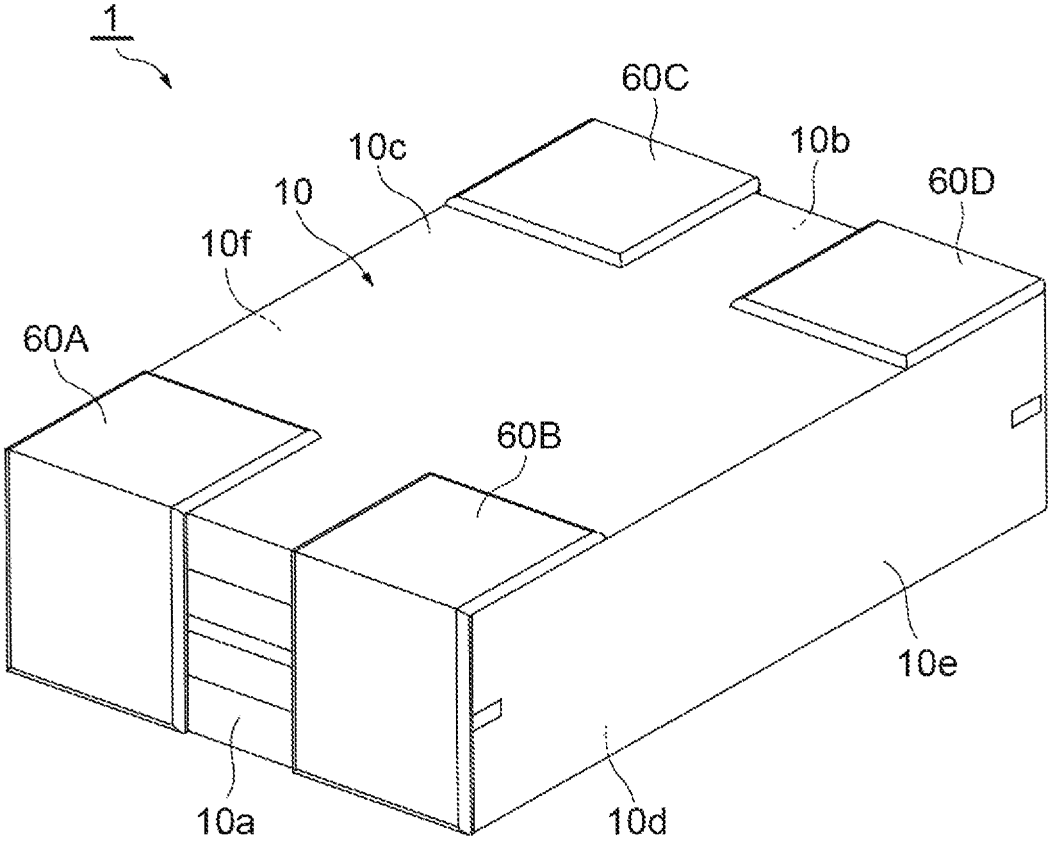
FIG. 1 is a schematic perspective view of a coil component according to an embodiment.

Hereinafter, embodiments of the present disclosure will be described in detail with reference to the accompanying drawings. In the description, the same reference numerals are used for the same elements or elements having the same functions, and redundant description will be omitted.

The coil component 1 according to one embodiment is, for example, a balun coil. The balun coil is used, for example, when a near field communication circuit (NFC circuit) is mounted on a cellular terminal, for example. The balun coil performs conversion between an unbalanced signal of the antenna and a balanced signal of the NFC circuit, thereby realizing connection between the unbalanced circuit and the balanced circuit. The coil component 1 can also be used for a common mode filter or a transformer.

As shown in FIG. 1, the coil component 1 includes an element body 10, a coil structure 20 embedded in the element body 10, and two pairs of external terminal electrodes 60A, 60B, 60C, and 60D provided on a face of the element body 10.

The element body 10 has a rectangular parallelepiped outer shape and has six faces 10*a* to 10*f*. As an example, the element body 10 is designed to have dimensions of long side 2.0 mm, short side 1.25 mm, and height 0.65 mm. Of the faces 10$a$ to 10$f$ of the element body 10, the end face 10$a$ (first end face) and the end face 10$b$ (second end face) are parallel to each other, the upper face 10$c$ and the lower face 10$d$ are parallel to each other, and the side faces 10$e$ and 10$f$ are parallel to each other. The upper face 10$c$ of the element body 10 is a face facing in parallel to a mounting face of a mounting substrate on which the coil component 1 is mounted.

The element body 10 is made of a metal magnetic powder-containing resin 12 which is one type of magnetic material. The metal magnetic powder-containing resin 12 is a bound powder in which magnetic metal powder is bound by a binder resin. The metal magnetic powder of the metal magnetic powder-containing resin 12 is composed of, for example, an iron-nickel alloy (permalloy alloy), carbonyl iron, an amorphous, FeSiCr alloy in amorphous or crystalline, sendust, or the like. The binder resin is, for example, a thermosetting epoxy resin. In the present embodiment, the content of the metal magnetic powder in the bound powder is 80 to 92 vol % in terms of volume percent, and 95 to 99 wt % in terms of weight percent. From the viewpoint of magnetic properties, the content of the metal magnetic powder in the bound powder may be 85 to 92 vol % in terms of volume percent and 97 to 99 wt % in terms of weight percent. The magnetic powder of the metal magnetic powder-containing resin 12 may be a powder having one type of average particle diameter or may be a mixed powder having a plurality of types of average particle diameters.

The metal magnetic powder-containing resin 12 of the element body 10 integrally covers a coil structure 20 described later. Specifically, the metal magnetic powder-containing resin 12 covers the coil structure 20 from above and below and covers the outer periphery of the coil structure 20. The metal magnetic powder-containing resin 12 fills the inner peripheral region of the coil structure 20.

The coil structure 20 includes an insulating substrate 30, an upper coil structure 40A provided on an upper side of the insulating substrate 30, and a lower coil structure 40B provided on a lower side of the insulating substrate 30.

Figure 3:
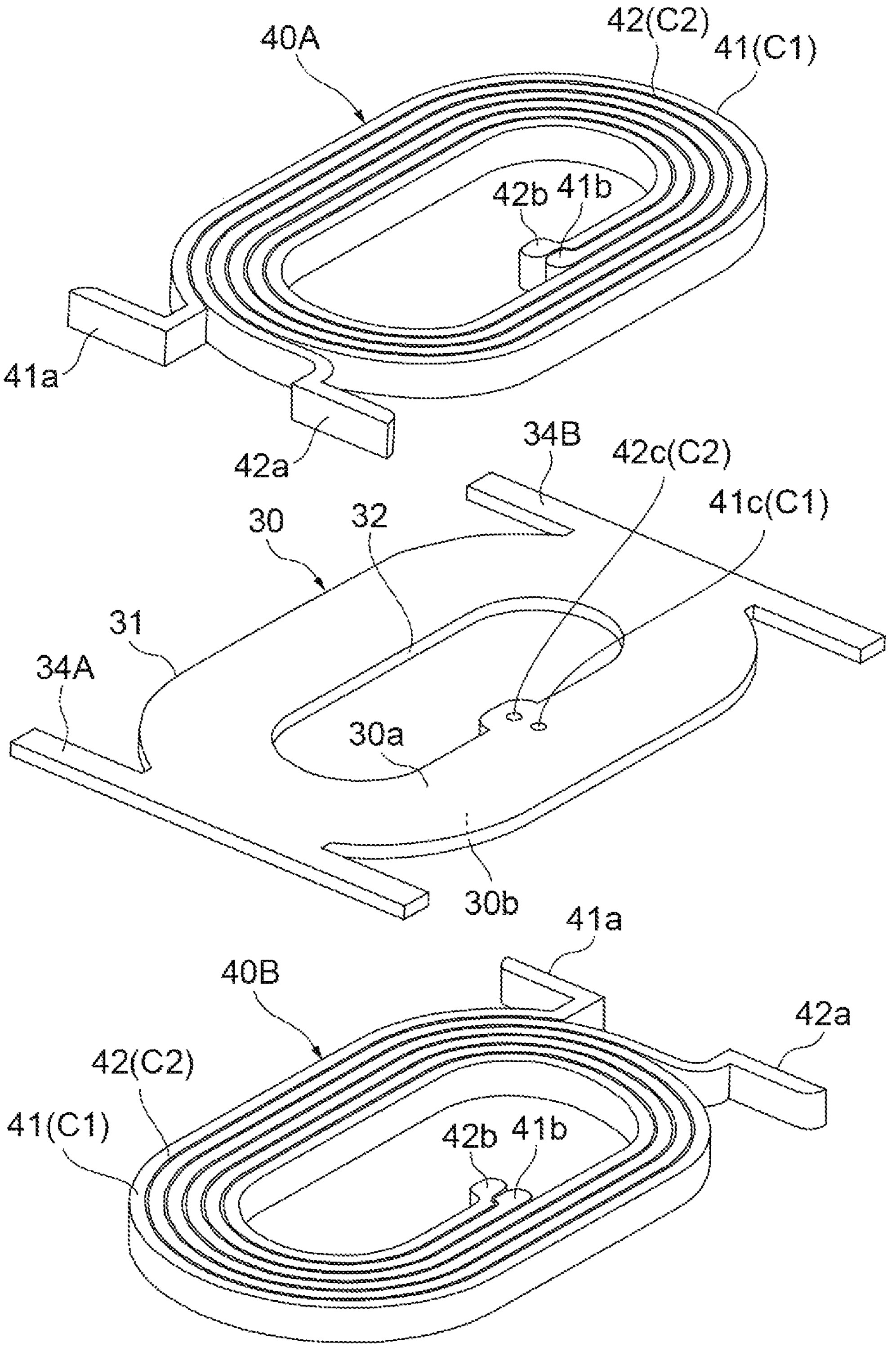
FIG. 3 is an exploded view of the coil shown in FIG. 2.

The insulating substrate 30 has a flat plate shape, extends between the end faces 10$a$ and 10$b$ of the element body 10, and is designed to be orthogonal to the end faces 10$a$ and 10$b$. The insulating substrate 30 extends in parallel to the upper face 10$c$ and the lower face 10$d$ of the element body 10. As shown in FIG. 3, the insulating substrate 30 includes an elliptical ring-shaped coil forming portion 31 extending along the long-side direction of the element body 10, and a pair of frame portions 34A and 34B extending along the short-side direction of the element body 10 and sandwiching the coil forming portion 31 from both sides. An elliptical opening 32 is provided in a central portion of the coil forming portion 31 and extending along the long-side direction of the element body 10.

The insulating substrate 30 is made of a nonmagnetic insulating material. The thickness of the insulating substrate 30 can be designed in a range of 10 to 60 μm, for example. In the present embodiment, the insulating substrate 30 has a configuration in which glass cloth is impregnated with epoxy resin. The resin constituting the insulating substrate 30 is not limited to the epoxy-based resin and may be a BT resin, polyimide, aramid, or the like. The insulating substrate 30 may be made of ceramic or glass. The constituent material of the insulating substrate 30 may be a mass-produced printed circuit board material. The insulating substrate 30 may be made of a plastic material used for a Bluetooth printed circuit board, a FR4 printed circuit board, or a FR5 printed circuit board.

Figure 2:
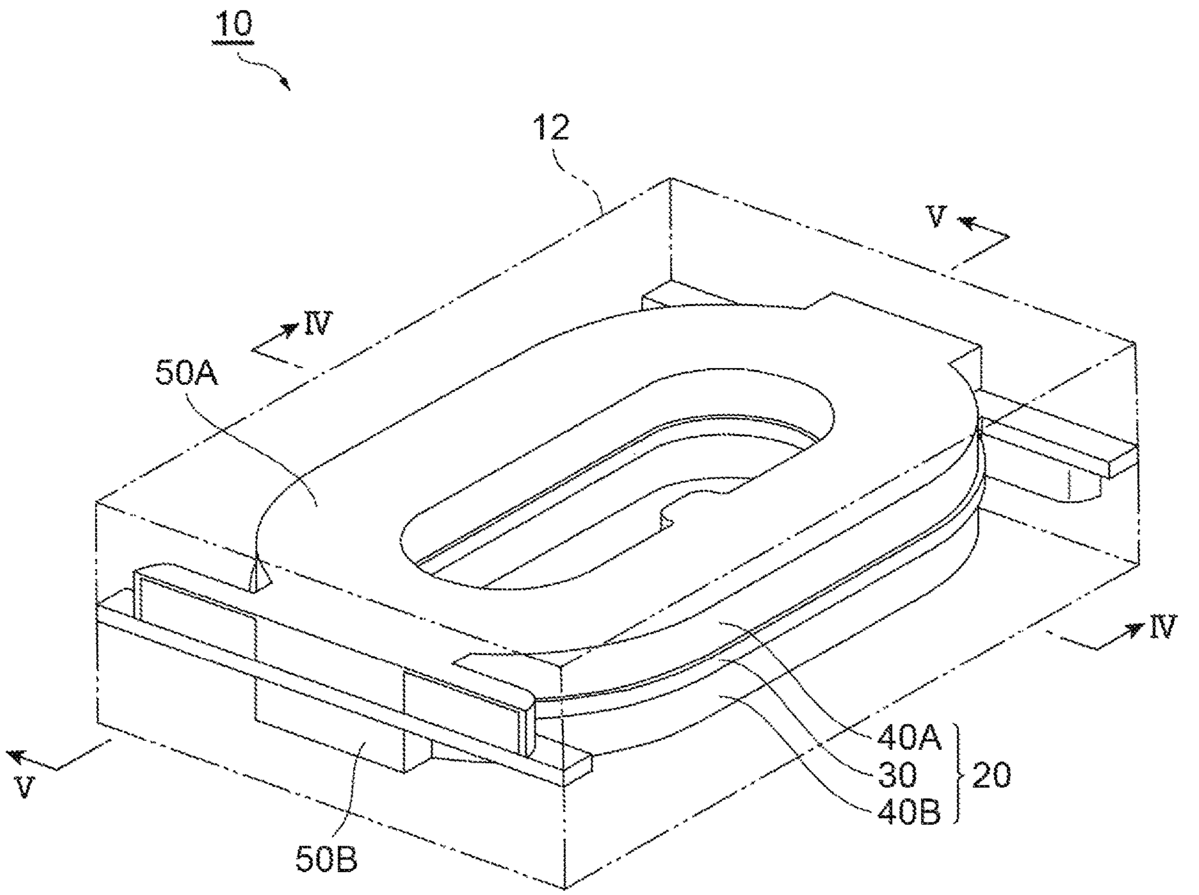
FIG. 2 shows the inside of the coil component of FIG. 1.

The upper coil structure 40A is provided on the substrate upper face 30$a$ of the coil forming portion 31 of the insulating substrate 30. As shown in FIGS. 2 and 3, the upper coil structure 40A includes a first planar coil 41, a second planar coil 42, and an upper insulator 50A. The first planar coil 41 and the second planar coil 42 are wound alongside and adjacent to each other on the upper face 30$a$ of the insulating substrate 30.

The first planar coil 41 is a substantially elliptical spiral air-core coil wound around the opening 32 of the coil forming portion 31 in the same layer on the upper face 30$a$ of the insulating substrate 30. The number of turns of the first planar coil 41 may be one or a plurality of turns. In the present embodiment, the number of turns of the first planar coil 41 is three to four. The first planar coil 41 has an outer end portion 41$a$ and an inner end portion 41$b$. The outer end portion 41$a$ is provided on the frame portion 34A and is exposed from the end face 10$a$ of the element body 10. The inner end portion 41$b$ is provided at an edge of the opening 32. The insulating substrate 30 is provided with a first through conductor 41$c$ extending in the thickness direction of the insulating substrate 30 to penetrate the insulating substrate 30 at a position overlapping the inner end portion 41$b$ of the first planar coil 41. The first planar coil 41 is made of Cu, for example, and can be formed by electrolytic plating.

Similarly to the first planar coil 41, the second planar coil 42 is a substantially elliptical spiral air-core coil wound around the opening 32 of the coil forming portion 31 in the same layer on the upper face 30$a$ of the insulating substrate 30. The second planar coil 42 is wound so as to be adjacent to the first planar coil 41 on the inner peripheral side of the first planar coil 41. The number of turns of the second planar coil 42 may be one or a plurality of turns. In the present embodiment, the number of turns of the second planar coil 42 is the same as the number of turns of the first planar coil 41. The second planar coil 42 has an outer end portion 42$a$ and an inner end portion 42$b$. Similarly to the outer end portion 41$a$ of the first planar coil 41, the outer end portion 42$a$ of the second planar coil 42 is provided in the frame portion 34A and is exposed from the end face 10$a$ of the element body 10. The inner end portion 42$b$ of the second planar coil 42 is provided at the edge of the opening 32 and is adjacent to the inner end portion 41$b$ of the first planar coil 41. The insulating substrate 30 is provided with a second through conductor 42$c$ extending in the thickness direction of the insulating substrate 30 to penetrate the insulating substrate 30 at a position overlapping the inner end portion 42$b$ of the second planar coil 42. The second through conductor 42$c$ is adjacent to the first through conductor 41$c$. Similarly to the first planar coil 41, the second planar coil 42 is made of Cu, for example, and can be formed by electrolytic plating.

Figure 4:
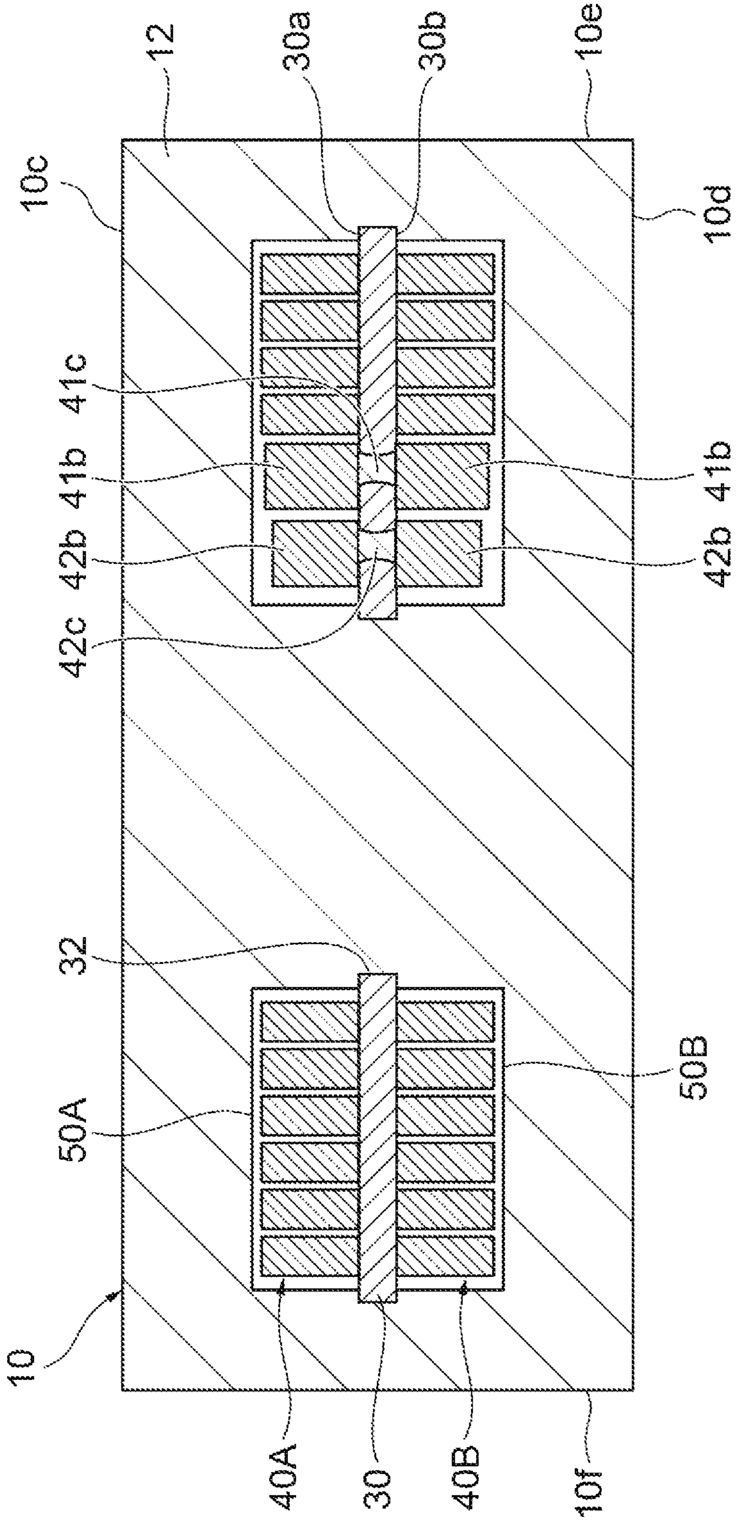
FIG. 4 is a cross-sectional view taken along line IV-IV of the coil component shown in FIG. 2.
Figure 5:
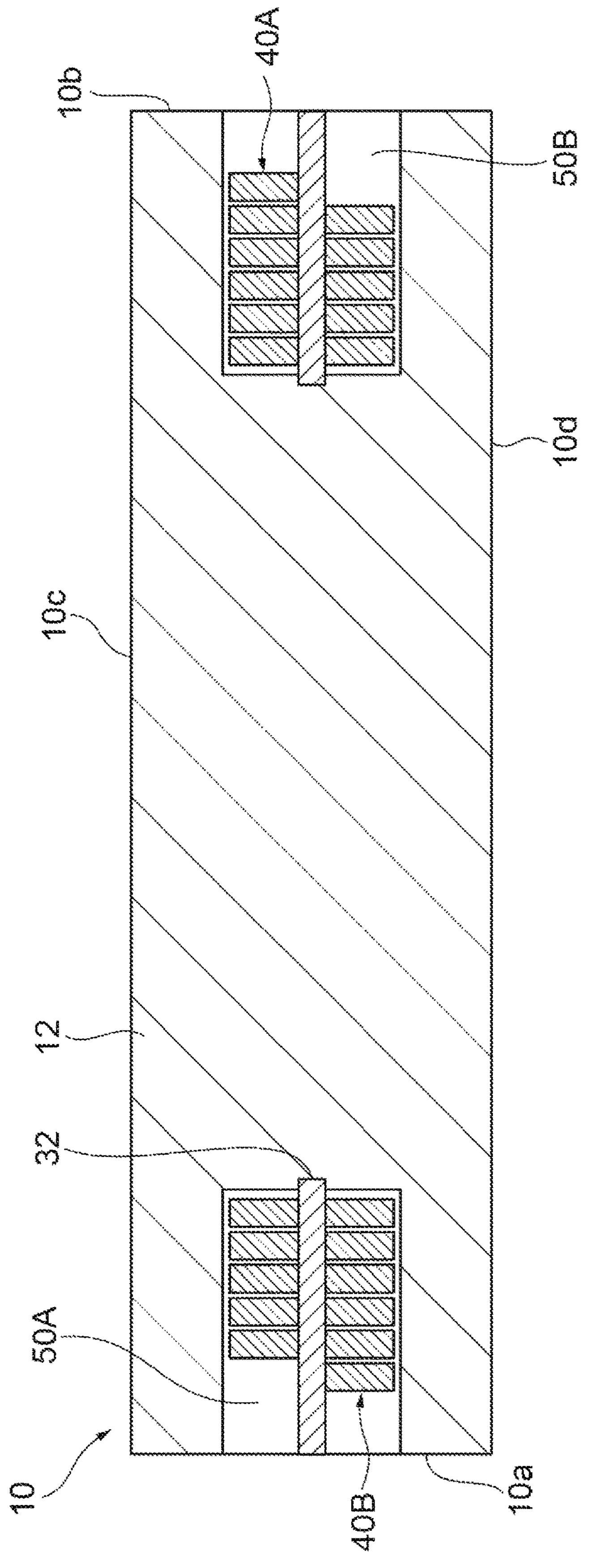
FIG. 5 is a cross-sectional view taken along line V-V of the coil component shown in FIG. 2.
Figure 6:
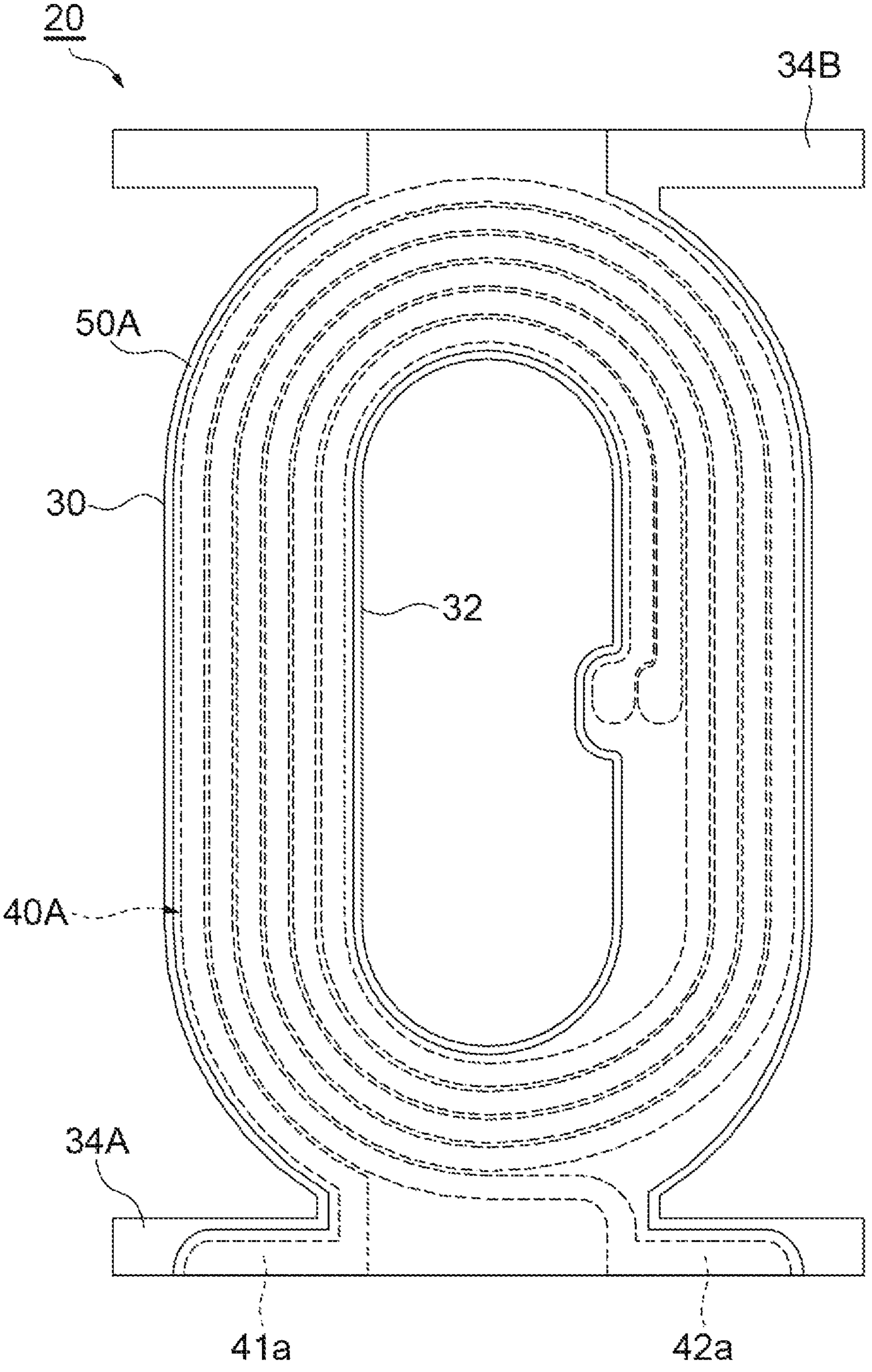
FIG. 6 is a plan view of the coil shown in FIG. 2.

The upper insulator 50A is provided on the upper face 30$a$ of the insulating substrate 30 and is a thick-film resist patterned by known photolithography. The thick-film resist of the upper insulator 50A defines a plating growth region of the first planar coil 41 and the second planar coil 42. In the present embodiment, as shown in FIG. 4, the upper insulator 50A integrally covers the first planar coil 41 and the second planar coil 42, and more specifically, covers side faces and upper faces of the first planar coil 41 and the second planar coil 42. In the present embodiment, the upper insulator 50A includes an insulating film that covers the upper faces of the first planar coil 41 and the second planar coil 42. As shown in FIGS. 5 and 6, a portion of the upper insulator 50A extends from the inside of the element body 10 to the end face 10*a* of the element body 10 through between the outer end portion 41*a* and the outer end portion 42*a*, and is exposed at the end face 10*a*. Further, as shown in FIGS. 5 and 6, a part of the upper insulator 50A extends from the inside of the element body 10 to the end face 10*b* along the upper face 30*a* and is exposed at the end face 10*b*. The upper insulator 50A is thicker than the first planar coil 41 and the second planar coil 42. The upper insulator 50A is made of, for example, epoxy.

The lower coil structure 40B is provided on the lower face 30*b* of the coil forming portion 31 of the insulating substrate 30. As shown in FIGS. 2 and 3, the lower coil structure 40B includes a first planar coil 41, a second planar coil 42, and a lower insulator 50B. The first planar coil 41 and the second planar coil 42 are wound alongside and adjacent to each other on the lower face 30*b* of the insulating substrate 30.

The first planar coil 41 and the second planar coil 42 of the lower coil structure 40B are symmetrical to the first planar coil 41 and the second planar coil 42 of the upper coil structure 40A. Specifically, the first planar coil 41 and the second planar coil 42 of the lower coil structure body 40B have shapes obtained by inverting the first planar coil 41 and the second planar coil 42 of the upper coil structure 40A around axes parallel to the short sides of the element body 10.

The outer end portion 41*a* of the first planar coil 41 of the lower coil structure 40B is provided in the frame portion 34B and is exposed from the end face 10*b* of the element body 10. The inner end portion 41*b* of the first planar coil 41 of the lower coil structure 40B overlaps the first through conductor 41*c* provided in the insulating substrate 30. Therefore, the inner end portion 41*b* of the first planar coil 41 of the lower coil structure 40B is electrically connected to the inner end portion 41*b* of the first planar coil 41 of the upper coil structure 40A via the first through conductor 41*c*. The first planar coil 41 of the lower coil structure 40B is made of Cu, for example, and can be formed by electrolytic plating.

The outer end portion 42*a* of the second planar coil 42 of the lower coil structure 40B is provided in the frame portion 34B and is exposed from the end face 10*b* of the element body 10. The inner end portion 42*b* of the second planar coil 42 of the lower coil structure 40B overlaps the second through conductor 42*c* provided in the insulating substrate 30. Therefore, the inner end portion 42*b* of the second planar coil 42 of the lower coil structure 40B is electrically connected to the inner end portion 42*b* of the second planar coil 42 of the upper coil structure 40A via the second through conductor 42*c*. The second planar coil 42 of the lower coil structure 40B is made of, for example, Cu, and can be formed by electrolytic plating.

The lower insulator 50B is provided on the lower face 30*b* of the insulating substrate 30 and is a thick-film resist patterned by known photolithography. Similarly to the thick-film resist of the upper insulator 50A, the thick-film resist of the lower insulator 50B defines a plating growth region of the first planar coil 41 and the second planar coil 42. In the present embodiment, as shown in FIG. 4, the lower insulator 50B integrally covers the first planar coil 41 and the second planar coil 42, and more specifically, covers side faces and upper faces of the first planar coil 41 and the second planar coil 42. In the present embodiment, the lower insulator 50B includes an insulating film that covers the upper faces of the first planar coil 41 and the second planar coil 42. Similarly to the upper insulator 50A, a portion of the lower insulator 50B extends from the inside of the element body 10 to the end face 10*b* of the element body 10 through between the outer end portion 41*a* and the outer end portion 41*b*, and is exposed at the end face 10*b*. A portion of the lower insulator 50B extends along the lower face 30*b* from the inside of the element body 10 to the end face 10*a* and is exposed at the end face 10*a*. The lower insulator 50B is thicker than the first planar coil 41 and the second planar coil 42. The lower insulator 50B may have the same thickness as the upper insulator 50A. The lower insulator 50B is made of, for example, epoxy.

The element body 10 includes a pair of coil portions C1 and C2 constituting a double coil structure. The first coil portion C1 includes the first planar coil 41 of the upper coil structure 40A provided on the upper face 30*a* of the insulating substrate 30, the first planar coil 41 of the lower coil structure 40B provided on the lower face 30*b* of the insulating substrate 30, and the first through conductor 41*c* connecting the first planar coils 41 on both faces. In the first coil portion C1, the outer end portion 41*a* of the first planar coil 41 of the upper coil structure 40A constitutes a first end portion, and the outer end portion 41*a* of the first planar coil 41 of the lower coil structure 40B constitutes a second end portion. The second coil portion C2 is constituted by the second planar coil 42 of the upper coil structure 40A provided on the upper face 30*a* of the insulating substrate 30, the second planar coil 42 of the lower coil structure 40B provided on the lower face 30*b* of the insulating substrate 30, and the second through conductor 42*c* connecting the second planar coils 42 on both faces. In the second coil portion C2, the outer end portion 42*a* of the second planar coil 42 of the upper coil structure 40B constitutes a first end portion, and the outer end portion 42*a* of the second planar coil 42 of the lower coil structure 40B constitutes a second end portion.

The two pairs of external terminal electrodes 60A, 60B, 60C, and 60D are provided in pairs on end faces 10*a* and 10*b* of the element body 10 that are parallel to each other.

Of the pair of external terminal electrodes 60A and 60B provided on the end face 10*a*, the external terminal electrode 60A is connected to the outer end portion 41*a* of the first planar coil 41 of the upper coil structure 40A, and the external terminal electrode 60B is connected to the outer end portion 42*a* of the second planar coil 42 of the upper coil structure 40A. As shown in FIG. 6, when viewed from the end face 10*a* side, the external terminal electrode 60A is biased toward the side face 10*f* side, and covers the end face 10*a* up to near the edge of the side face 10*f*. The external terminal electrode 60B is biased toward the side face 10*e* side, and covers the end face 10*a* up to near the edge of the side face 10*e*. When viewed from the end face 10*a* side, the external terminal electrode 60A and the external terminal electrode 60B are separated by a predetermined uniform width.

Of the pair of external terminal electrodes 60C and 60D provided on the end face 10*b*, the external terminal electrode 60C is connected to the outer end portion 41*a* of the first planar coil 41 of the lower coil structure 40B, and the external terminal electrode 60D is connected to the outer end portion 42*a* of the second planar coil 42 of the lower coil structure 40B. The external terminal electrode 60C is biased toward the side face 10*f* side and covers the end face 10*b* up to near the edge of the side face 10*f*. The external terminal electrode 60D is biased toward the side face 10*e* side, and covers the end face 10*b* up to near the edge of side face 10*e*. When viewed from the end face 10*b* side, the external terminal electrode 60C and the external terminal electrode 60D are separated by a predetermined uniform width.

The external terminal electrode 60A of the end face 10*a* and the external terminal electrode 60C of the end face 10*b* are provided at positions corresponding to each other in the long-side direction of the element body 10. Similarly, the external terminal electrode 60B on the end face 10*a* and the external terminal electrode 60D on the end face 10*b* are provided at positions corresponding to each other in the long-side direction of the element body 10.

Each of the external terminal electrodes 60A, 60B, 60C, and 60D is bent in an L-shape and continuously covers the end faces 10*a* and 10*b* and the upper face 10*c*. In the present embodiment, the external terminal electrodes 60A, 60B, 60C, and 60D are made of resinous electrodes, for example, made of resins containing Ag powder.

Figure 7:
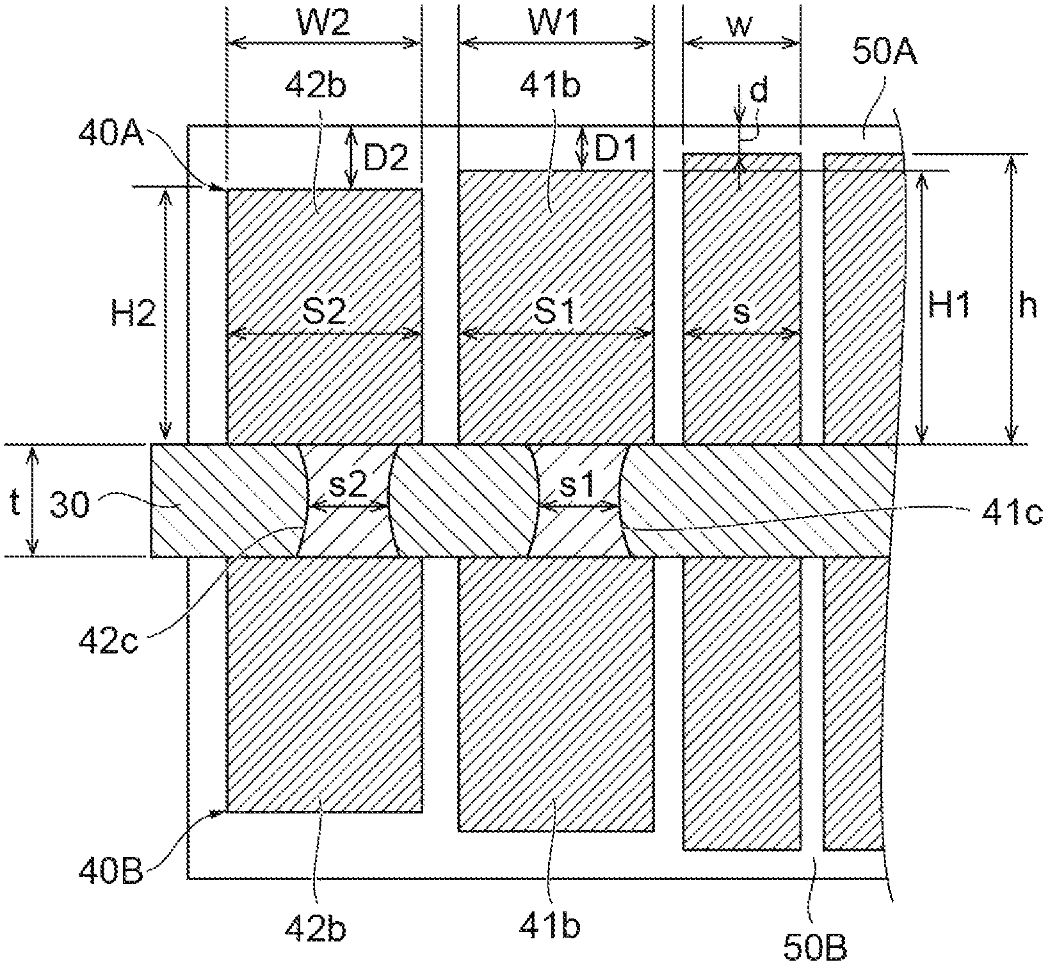
FIG. 7 is an enlarged view of a main part of the cross-sectional view shown in FIG. 4.

Next, the configurations of the inner end portions 41*b* and 42*b* and the through conductors 41*c* and 42*c* of the planar coils 41 and 42 will be described with reference to FIG. 7. FIG. 7 shows a cross section orthogonal to the insulating substrate 30 and passing through the through conductors 41*c* and 42*c*, and is an enlarged view of a main part of the cross section of FIG. 4. In the following description, the configurations of the planar coils 41 and 42 in the upper coil structure 40A will be described, but the configurations of the planar coils 41 and 42 in the lower coil structure 40B are also identical or similar.

As shown in FIG. 7, both the cross-section area S1 of the inner end portion 41*b* of the first planar coil 41 and the cross-section area S2 of the inner end portion 42*b* of the second planar coil 42 are designed to be larger than the cross-sectional area of the portion of the turns located outside the inner end portions 41*b* and 42*b*. In the embodiment shown in FIG. 7, the width W1 of the inner end portion 41*b* of the first planar coil 41 and the width W2 of the inner end portion 42*b* of the second planar coil 42 are both wider than the width w of the planar coils 41 and 42 of the turns outside the inner end portions 41*b* and 42*b*. Further, in the embodiment shown in FIG. 7, the thickness D1 of the insulating material covering the inner end portion 41*b* of the first planar coil 41 and the thickness D2 of the insulating material covering the inner end portion 42*b* of the second planar coil 42 are both greater than the thickness d of the insulating material covering the planar coils 41 and 42 of the turns outside the inner end portions 41*b* and 42*b*.

The cross-sectional area S1 of the inner end portion 41*b* of the first planar coil 41 and the cross-sectional area S2 of the inner end portion 42*b* of the second planar coil 42 are designed to be different from each other. The cross-sectional areas S1 and S2 may be designed to be equal to each other. In the embodiment shown in FIG. 7, the cross-sectional area S1 of the inner end portion 41*b* of the first planar coil 41 is larger than the cross-sectional area S2 of the inner end portion 42*b* of the second planar coil 42. Further, the thickness H1 of the inner end portion 41*b* of the first planar coil 41 and the thickness H2 of the inner end portion 42*b* of the second planar coil 42 are designed to be different from each other. In the embodiment shown in FIG. 7, the inner end portion 41*b* of the first planar coil 41 is thicker than the inner end portion 42*b* of the second planar coil 42. As for the thickness of the upper insulator 50A, the thickness D1 of the insulating materials in the portion covering the inner end portion 41*b* of the first planar coils 41 is thinner than the thickness D2 of the insulating materials in the portion covering the inner end portion 42*b* of the second planar coils 42. The thicknesses D1 and D2 may be the same. The width W1 of the inner end portion 41*b* of the first planar coil 41 may be different from or the same as the width W2 of the inner end portion 42*b* of the second planar coil 42.

The first through conductor 41*c* overlapping with the inner end portion 41*b* of the first planar coil 41 and the second through conductor 42*c* overlapping with the inner end portion 42*b* of the second planar coil 42 have the same thickness as the thickness t of the insulating substrate 30. Each of the first through conductor 41*c* and the second through conductor 42*c* has a circular cross section in the thickness direction of the insulating substrate 30. The insulating substrate 30 is designed to be thinner than the diameters of the first through conductor 41*c* and the second through conductor 42*c* (i.e., the dimension in the extending direction of the insulating substrate 30). The cross-sectional area s1 of the first through conductor 41*c* is narrower than the cross-sectional area S1 of the inner end portion 41*b* of the first planar coil 41. The cross-sectional area s2 of the second through conductor 42*c* is narrower than the cross-sectional area S2 of the inner end portion 42*b* of the second planar coil 42. Each of the first through conductor 41*c* and the second through conductor 42*c* has a constricted cross-sectional shape and becomes narrower toward the inner side from the upper and lower faces 30*a* and 30*b* of the insulating substrate 30. In addition, both the first through conductor 41*c* and the second through conductor 42*c* are biased to the coil outer peripheral side (right side in FIG. 7) with respect to the inner end portions 41*b* and 42*b* of the planar coils 41 and 42. The first through conductor 41*c* and the second through conductor 42*c* may not be biased to the coil outer peripheral side (for example, may be aligned with the center position of the inner end portions 41*b* and 42*b*).

As described above, the cross-sectional areas s1 and s2 of the through conductors 41*c* and 42*c* are relatively narrow (for example, narrower than the cross-sectional areas S1 and S2 of the inner end portions 41*b* and 42*b* of the planar coils 41 and 42), and the current density of the current flowing through the planar coils 41 and 42 at the time of driving the coil component 1 is high in the through conductors 41*c* and 42*c*. Therefore, heat is easily generated in the through conductors 41*c* and 42*c*. In particular, in a configuration in which the through conductors 41*c* and 42*c* are adjacent to each other as in the coil component 1, excessive heat generation is likely to occur. In addition, when the cross-sectional shape of the through conductors 41*c* and 42*c* is constricted, the current density becomes higher, and heat is easily generated.

In the coil component 1, since the cross-sectional areas S1 and S2 of the inner end portions 41*b* and 42*b* of the planar coils 41 and 42 are designed to be relatively large (for example, relative to the cross-sectional area s of the turns located outside the inner end portions 41*b* and 42*b*), heat generated in the through conductors 41*c* and 42*c* is easily transferred to the inner end portions 41*b* and 42*b*. As described above, in the coil component 1, since heat is efficiently transferred from the through conductors 41*c* and 42*c* to the inner end portions 41*b* and 42*b*, high heat radiation is achieved in the vicinities of the through conductors 41*c* and 42*c*.

It should be noted that the present disclosure is not limited to the above-described embodiment and may take various forms.

For example, the number of turns of the first coil portion and the number of turns of the second coil portion can be increased or decreased as appropriate. Further, the element body of the coil portion may include three or more coil portions.

What is claimed is:

1. A coil component comprising:

an element body;

an insulating substrate having an opening and provided in the element body; and a pair of coil portions including a pair of planar coils wound around the opening alongside with each other on the insulating substrate and a pair of through conductors respectively overlapping inner end portions of the planar coils adjacent to each other at an edge on the same side with respect to the opening and penetrating the insulating substrate;

wherein in a cross section orthogonal to the insulating substrate, a cross-sectional area of the inner end portion of the planar coil is larger than a cross-sectional area of a portion of the planar coil located outside the inner end portion, and is larger than a cross-sectional area of the through conductor, and wherein in the cross section orthogonal to the insulating substrate, thicknesses of the inner end portions of the pair of planar coils in a direction away from the insulating substrate are different from each other.

2. The coil component according to claim 1, wherein the inner end portion of the planar coil is lower than a portion of the planar coil located outside the inner end portion.

3. The coil component according to claim 1, wherein the inner end portion of the planar coil is wider than a portion of the planar coil located outside the inner end portion.

4. The coil component according to claim 1, wherein the planar coil is covered with an insulating material, and the insulating material covering the inner end portion of the planar coil is thicker than the insulating material covering a portion of the planar coil located outside the inner end portion.

5. The coil component according to claim 1, wherein the insulating substrate is thinner than the inner end portion of the planar coil.

6. The coil component according to claim 1, wherein the insulating substrate is thinner than a dimension of the through conductor in an extending direction of the insulating substrate.

7. The coil component according to claim 1, wherein the through conductor has a constricted cross-sectional shape in a cross section orthogonal to the insulating substrate.

8. The coil component according to claim 1, wherein the through conductor is biased outward with respect to the inner end portion of the planar coil.

* * * * *